United States Patent [19]
Honda et al.

[11] Patent Number: 5,748,632
[45] Date of Patent: May 5, 1998

[54] ATM SWITCHING APPARATUS

[75] Inventors: Masahiko Honda; Yasuhiro Miyao, both of Tokyo, Japan

[73] Assignee: NEC Corporation, Tokyo, Japan

[21] Appl. No.: 676,501

[22] Filed: Jul. 8, 1996

[30] Foreign Application Priority Data

Jul. 7, 1995 [JP] Japan ................................. 7-171898

[51] Int. Cl.$^6$ ................................................ H04L 12/56
[52] U.S. Cl. ........................................... 370/399; 370/409
[58] Field of Search ................................ 370/351, 389, 370/352, 395, 396, 397, 398, 399, 390, 409, 419, 420, 428, 429, 471, 474, 475, 422

[56] References Cited

U.S. PATENT DOCUMENTS

| | | | |
|---|---|---|---|
| 5,062,106 | 10/1991 | Yamazaki et al. | 370/397 |
| 5,067,123 | 11/1991 | Hyodo et al. | 370/396 |
| 5,084,867 | 1/1992 | Tachibana et al. | 370/398 |
| 5,379,295 | 1/1995 | Yonehara | 370/400 |
| 5,568,479 | 10/1996 | Watanabe et al. | 370/399 |

*Primary Examiner*—Alpus H. Hsu
*Assistant Examiner*—Kwang B. Yao
*Attorney, Agent, or Firm*—Young & Thompson

[57] ABSTRACT

ATM switching apparatus having a capability of switching ATM cells without providing a conversion table for converting routing information in the ATM switch unit and channel identification information of VPI and VCI. is When a call set-up request is originated from a terminal $1a$, a call control unit 13 designates, as a channel identification information, an output port number $P_{o1n}$ of a switch unit 12 corresponding to a terminal $1n$ and a channel identifier LCN of a logical channel for coupling a terminal $1a$ with a terminal $1n$, and an output port number $P_{o1a}$ corresponding to the terminal $1a$ and the LCN to the terminal $1n$. When a cell is transmitted from the terminal $1a$, the $P_{o1n}$ and LCN are stored into a header portion of the cell. In a line terminating unit $11a$, an input port number $P_{I1a}$ corresponding to the terminal $1a$ is added to the header portion, and the cell is switched in the switching unit 12 by information of the $P_{o1n}$ and the LCN. In a line terminating unit $11n$, the $P_{o1a}$ is erased from the header portion of the cell, and the input port number $P_{I1a}$ and the LCN are formed for channel identification information to be supplied to the receiving side of terminal $1a$.

4 Claims, 3 Drawing Sheets

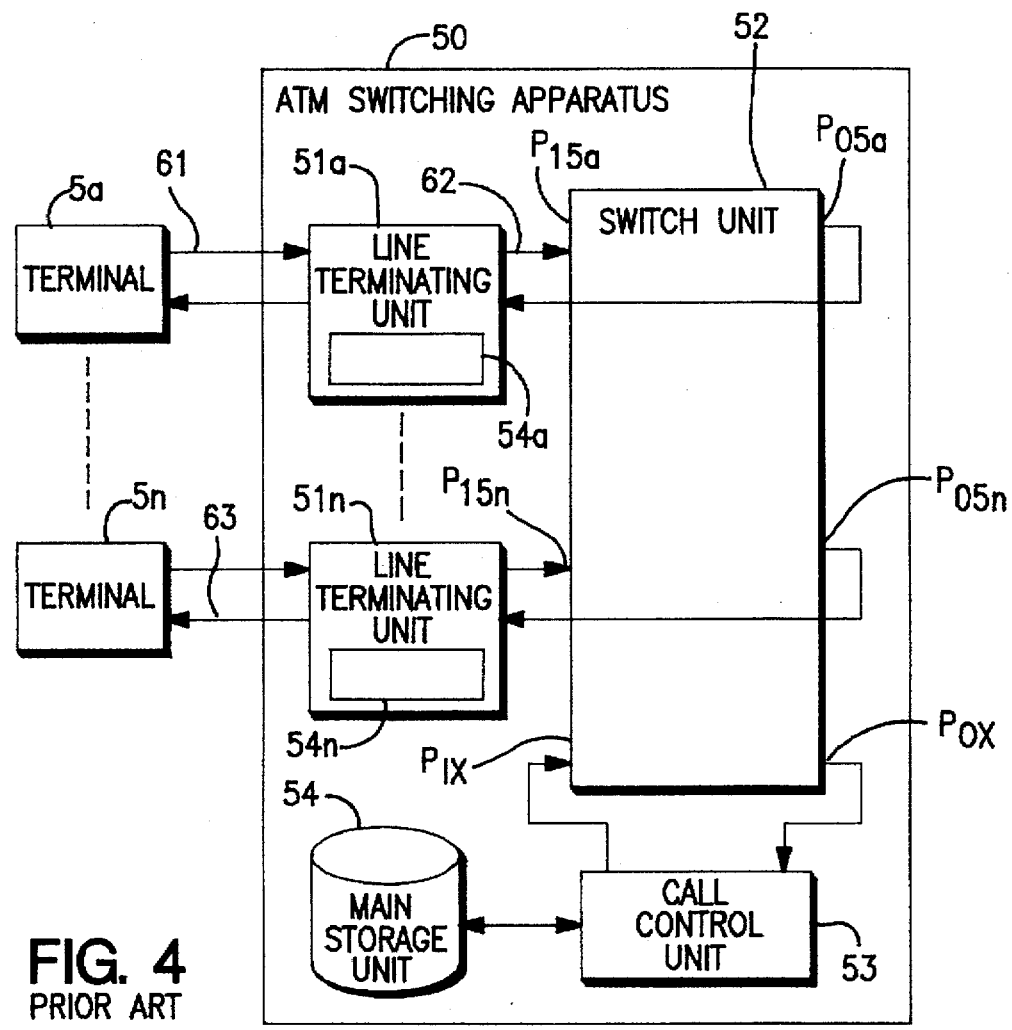
FIG. 4
PRIOR ART
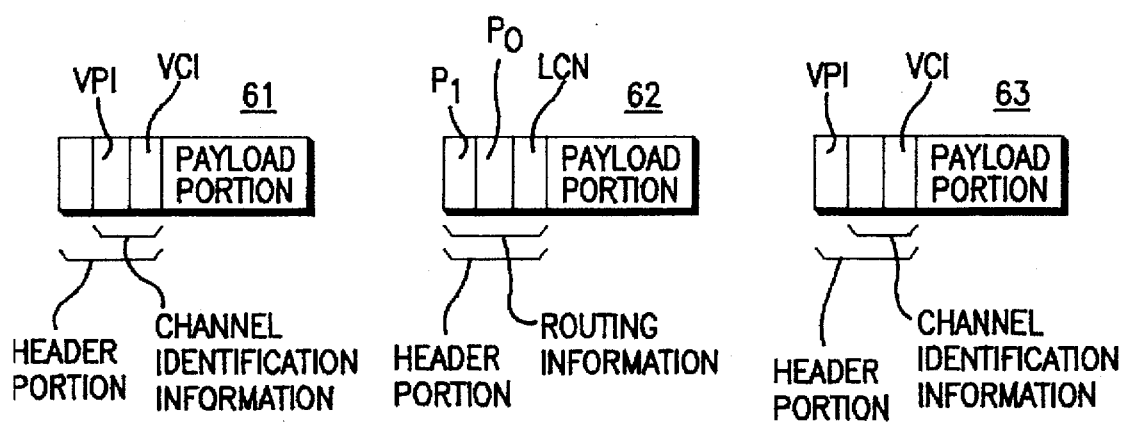
FIG. 5(a)
PRIOR ART
FIG. 5(b)
PRIOR ART
FIG. 5(c)
PRIOR ART

ATM SWITCHING APPARATUS

BACKGROUND OF THE INVENTION

1. Field of the Invention

The present invention relates to an Asynchronous Transfer Mode (ATM) switching apparatus, and more specifically, to an ATM switching apparatus for switching and outputting an incoming ATM cell to a required output port based upon routing information stored in a header portion of the incoming ATM cell.

2. Description of the Related Art

Conventionally, in this sort of ATM switching apparatus, the incoming ATM cell is switched and output to a required output port to be routed by an arrangement as shown in FIG. 4.

Assuming now that an ATM cell is transmitted from an ATM terminal (will be simply referred to as a "terminal" hereinafter) 5a to another terminal 5n, which are connected and accommodated in an ATM switching apparatus 50, at the terminal 5a, both a virtual path identifier (will be referred to as a "VPI" hereinafter) and a virtual channel identifier (will be referred to as a "VCI" hereinafter) used to identify a logical channel preset between this terminal 5a and the terminal 5n are first stored as channel identification information to a header portion of this ATM cell, and then this channel identification information is transmitted.

In a line terminating unit 51a of the ATM switching apparatus 50, as indicated in FIG. 5(a), an ATM cell 61 transmitted from the terminal 5a is received, and the channel identification information is read out from the header portion of this ATM cell, namely the VPI and VCI stored in the header portion, and routing information corresponding to this channel identification information is acquired from a conversion table 54a.

This routing information implies such information required to execute a cell switching process in a self-routing type switch unit 52. An input port number $P_I$ and an output port number $P_o$ of the switch unit 52 corresponding to the logical channel designated by the VPI and VCI, and also a logical channel identifier LCN for coupling these input port and output port are preset into the conversion tables 54a to 54n based upon call control information stored in a main storage unit 54.

In this case, the channel identification information of VPI and VCI is converted to the routing information of an input port $P_{I5a}$, an output port $P_{o5n}$, and a logical channel identifier, which indicate a route up to the terminal 5n, by the conversion table 54a. Also, the above routing information is stored in the header portion of the ATM cell 61 instead of the VPI and VCI, so that an ATM cell 62 as shown in FIG. 5(b) is produced and enters the input port $P_{I5a}$ of the switch unit 52.

This ATM cell 62 is switched in the switch unit 52 based upon the routing information stored in the header portion of the cell, and then, the ATM cell 62 is output from the output port $P_{o5n}$.

The line terminating unit 51n, of the output port side, receives the ATM cell 62 from the switch unit 52, and acquires the channel identification information, namely the VPI and VCI, corresponding to the routing information stored in the header portion of the ATM cell 62 from a conversion table 54n by a similar manner to the above-described conversion table 54a.

Subsequently, instead of the routing information of the header portion of the ATM cell 62, the VPI and VCI acquired from the conversion table 54n are stored, so that an ATM cell 63 as indicated in FIG. 5(c) is produced and is transmitted to the terminal 5n.

In this manner, the ATM cell transmitted from the terminal 5a is received by the terminal 5n.

As a consequence, in such a conventional ATM switching apparatus, there are problems as follows. That is, since the conversion tables for converting information between the channel identification information and the routing information must be provided in all the respective line terminating units, a total amount of hardware would be increased. Also, since it is required to employ as this conversion table such a high-speed accessible memory in accordance with the communication speed of the ATM cell, high manufacturing cost would be required.

SUMMARY OF THE INVENTION

The present invention has been made to solve these problems, and therefore, an object of the invention is to provide an ATM switching apparatus manufactured at low cost, in which the amount of hardware in a line terminating unit may be reduced.

To achieve such an object, an ATM switching apparatus according to the present invention includes channel identification information having either the input port number of the self-routing type switch unit corresponding to the ATM terminal originating the ATM cell or the output port number of the self-routing type switch unit corresponding to the ATM terminal receiving the ATM cell, and also a channel identifier indicative of a logical channel for coupling the ATM terminal originating the ATM cell with the ATM terminal receiving the ATM cell; a line terminating unit that stores into the header portion of the ATM cell the routing information produced by adding the input port number to the output port number and the channel identifier, which are stored into the header portion of the ATM cell as the channel identification information, and then transfers the resultant cell to the self-routing type switch unit upon receipt of the ATM cell sent from the ATM terminal originating the ATM cell. The line terminating unit also erases the output port number stored as the routing information in the header portion of the ATM cell upon receipt of the ATM cell sent from the self-routing type switch unit, and then stores into the header portion of the ATM cell the channel identification information produced from the input port number and the channel identifier, and then transfer the resultant cell to the ATM terminal receiving the ATM cell.

As a consequence, upon receipt of the ATM cell sent from the ATM terminal originating the ATM cell, the line terminating unit adds the input port number to the channel identification information of the header portion of the ATM cell to thereby produce the routing information, and then stores this routing information into the header portion of the cell to be transferred to the switch unit. Also, upon receipt of the ATM cell sent from the self-routing type switch unit, the output port number stored into the header portion of the ATM cell as the routing information is erased, and then the channel identification information produced from the input number and the channel identifier is stored into the header portion of the ATM cell, which will be transferred to the ATM terminal.

Also, the ATM switching apparatus further comprises a call control unit connected to preselected input/output ports of the self-routing type switch unit, for selecting an arbitrary logical channel for coupling the ATM terminal originating the ATM cell with the cell receiving terminal, which are indicated by a call set-up request cell, upon receipt of the call set-up request cell sent from the ATM terminal originating the ATM cell, and for providing the output port number of the self-routing type switch unit corresponding to the ATM terminal receiving the ATM cell and also the channel identifier indicative of the logical channel as channel identification information to the ATM terminal originating the ATM cell, and further for providing the input port number of the self-routing type switch unit corresponding to the ATM terminal originating the ATM cell and also the channel identifier as the channel identification information to the ATM terminal receiving the ATM cell.

Accordingly, by way of the call control unit, an arbitrary logical channel for coupling the ATM terminal originating the ATM cell with the ATM terminal receiving the ATM cell, which are indicated by the call set-up request cell, is selected upon receipt of the call set-up request cell sent from the ATM terminal originating the ATM cell; the output port number of the self-routing type switch unit corresponding to the ATM terminal receiving the ATM cell and also the channel identifier indicative of the logical channel as channel identification information are provided to the ATM terminal originating the ATM cell; and further the input port number of the self-routing type switch unit corresponding to the ATM terminal originating the ATM cell and also the channel identifier as the channel identification information are provided to the ATM terminal receiving the ATM cell.

BRIEF DESCRIPTION OF THE DRAWINGS

FIG. 4 is a block diagram showing a configuration of the conventional ATM switching apparatus.

FIG. 5(a) is an explanatory diagram for showing a structure of a conventional ATM cell, which stores channel identification information in a header portion of the cell.

FIG. 5(b) is an explanatory diagram for showing a structure of a conventional ATM cell, which stores routing information in a header portion of the cell.

FIG. 5(c) is an explanatory diagram for showing a structure of a conventional ATM cell, which stores channel identification information in a header portion of the cell.

DETAILED DESCRIPTION OF THE PREFERRED EMBODIMENTS

The present invention will be described in the following by referring to the attached drawings.

Figure 1:
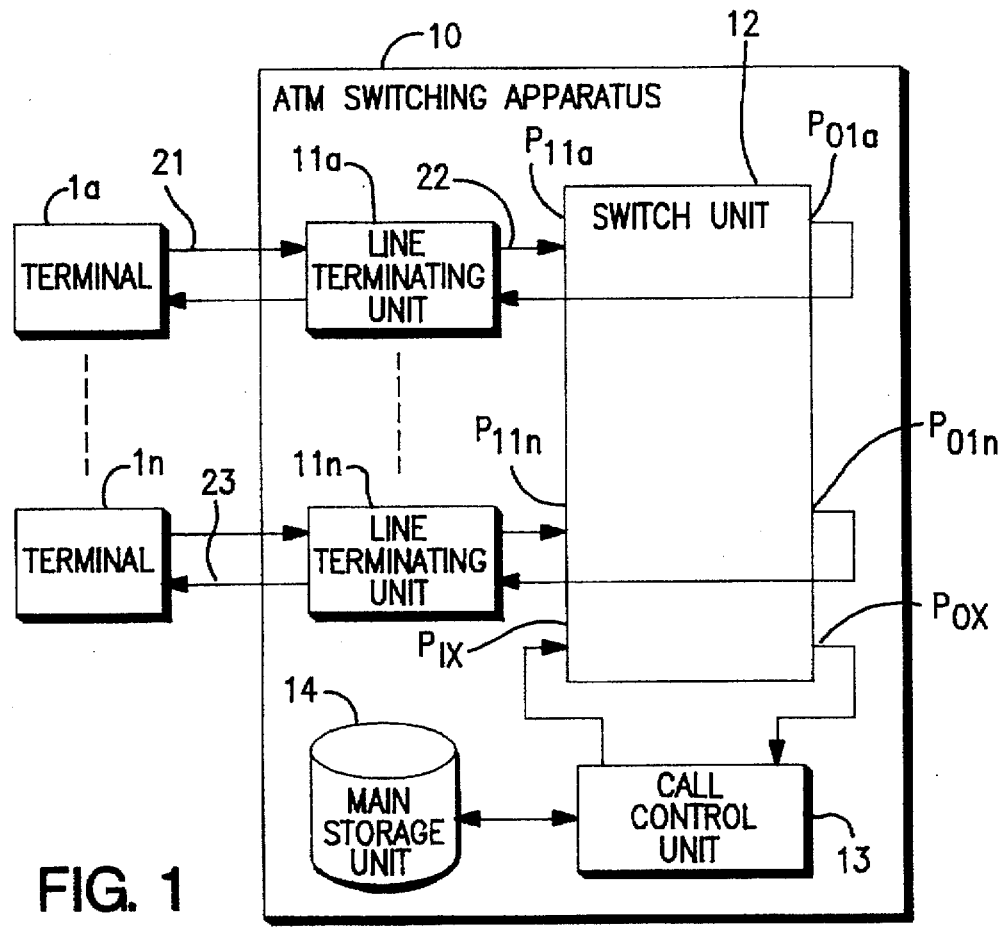
FIG. 1 is a block diagram showing a configuration of an ATM switching apparatus according to an embodiment of the present invention.

FIG. 1 is a block diagram of an ATM switching apparatus according to an embodiment of the present invention. In this drawing, reference numeral 10 indicates an ATM switching apparatus for switching an input ATM cell, and reference numerals 1a to 1n show ATM terminals (will be referred to as "terminals" hereinafter) connected and accommodated in the ATM switching apparatus 10. In the ATM switching apparatus 10, reference numerals 11a to 11n denote line terminating units each corrected to respective ones of the terminals 1a to 1n, and reference numeral 12 represents a self-routing type switch unit for switching an input ATM cell based upon routing information stored in the input ATM cell, and for outputting the switched ATM cell.

Reference numeral 13 represents a call control unit for controlling a connection between two terminals out of terminals 1a to 1n in accordance with a call set up request transmitted by a terminal. The call control unit returns to both terminals a portion of the routing information used in the switch unit 12 as channel identification information indicative of a logical channel for coupling terminals with each other in response to the call set up request originated from one of terminals 1a to 1n. Reference numeral 14 shows a main storage unit for storing call control information, reference numeral 21 indicates an ATM cell transmitted from the terminal 1a to the line terminating unit 11a, reference numeral 22 denotes an ATM cell entered from the line terminating unit 11a to the switch unit 12, and reference numeral 23 shows an ATM cell transmitted from the line terminating unit 11n to the terminal 1m.

Symbols $P_{I1a}$ to $P_{I1n}$ show input ports of the switch unit 12 into which the ATM cells from the line terminating units 11a to 11n are input, and symbols $P_{o1a}$ to $P_{o1n}$ indicate output ports of the switch unit 12 from which the switched ATM cells are output to the line terminating units 11a to 11n. Symbol $P_{Ix}$ denotes an input port into which the ATM cell sent from the call control unit 13 is input, and symbol $P_{Ox}$ is an output port from which the ATM cell is output to the call control unit 13.

Figures 2A, 2B, 2C:
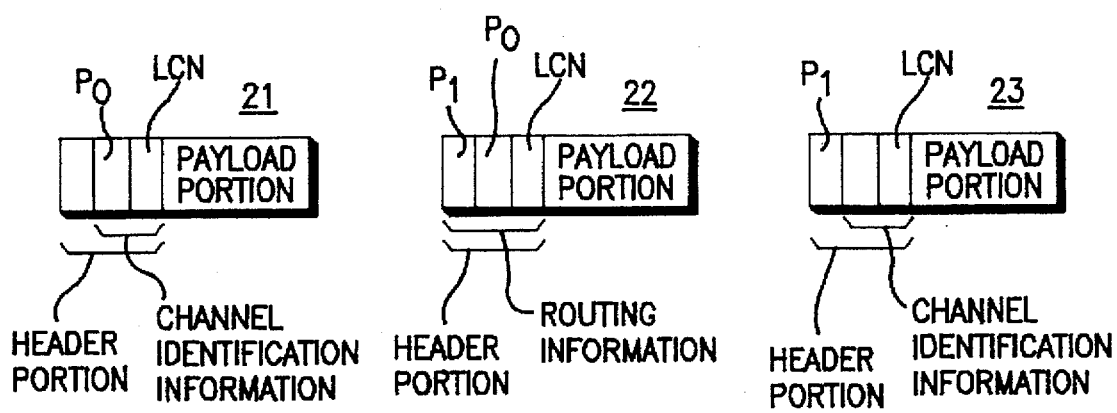
FIG. 2(a) is an explanatory diagram for showing a structure of an ATM cell, which stores channel identification information in a header portion of the cell, according to an embodiment of the present invention.
FIG. 2(b) is an explanatory diagram for showing a structure of an ATM cell, which stores routing information in a header portion of the cell, according to an embodiment of the present invention.
FIG. 2(c) is an explanatory diagram for showing a structure of an ATM cell, which stores channel identification information in a header portion of the cell, according to an embodiment of the present invention.

FIGS. 2(a) to 2(c) are explanatory diagrams for indicating structures of the respective ATM cells 21 to 23. FIG. 2(a) shows the ATM cell 21, FIG. 2(b) indicates the ATM cell 22, and FIG. 2(c) represents the ATM cell 23.

In FIGS. 2(a) to 2(c), symbol $P_I$ is an input port number of the switch unit 12, symbol $P_O$ denotes an output port number of the switch unit 12, and symbol LCN shows a channel identifier for identifying a logical channel between a cell originating terminal and a cell receiving terminal. Similar to the VCI and VPI of the conventional ATM cell (see FIG. 5), these symbols are stored as channel identification information into a header portion of each ATM cell.

Referring now to FIG. 1 and FIGS. 2(a) to 2(c), operations in case that an ATM cell is transmitted from the terminal 1a to the terminal 1n will be described as operations of the present invention.

First, in such a case that a logical channel is not preset between the terminal 1a and the terminal 1n, a call set-up request cell for requesting a call set up between the terminal 1a and the terminal 1n is transmitted from the terminal 1a to the call control unit 13. The output port $P_{Ox}$ used to deliver the cell to the call control unit 13 is fixedly provided with the switch unit 12.

As indicated in FIG. 2(a), the output port number $P_{OX}$ is stored in the output port $P_O$ of the header portion of the cell, and the channel identifier for the call set up request is stored in the channel identifier LCN of the header portion of the cell.

This call set-up request cell is received by the line terminating unit 11a, and as represented in FIG. 2(b), the input port number $P_{I1a}$ of the switch unit 12 for the terminal 1a (or line terminating unit 11a) is added into the input port number $P_I$ of the header portion of the cell, so that routing information is produced, and then the call set-up request cell is transmitted to the input port $P_{I1a}$ of the switch unit 12.

The switch unit 12 switches this call set-up request cell based upon the routing information stored in the header portion of this call set-up request cell, and outputs the call set-up request cell from the output port $P_{Ox}$ to the call control unit 13.

The call control unit 13 acquires the call control information from the main storage unit 14 in response to this call set-up request cell, and then provides to the cell originating terminal 1a both the output port number of the output port $P_{O1n}$ connected to the line terminating unit 11n, which accommodates therein the cell receiving terminal 1n, and the channel identifier representative of the logical channel for coupling the cell originating terminal with the cell receiving terminal.

Also, the call control unit 13 provides such channel information to the cell receiving terminal 1n. That is, both the output port number of the output port $P_{O1a}$ connected to the line terminating unit 11a, which accommodates the cell originating terminal 1a and the channel identifier indicative of the logical channel for coupling the cell originating terminal with the cell receiving terminal are stored as the channel identification information into the cell, and then are provided to the cell receiving terminal 1n.

Based upon the above-described information provided to both terminal 1a and terminal 1n, the output port number corresponding to the counterpart terminal and also the channel identifier for coupling the cell originating terminal 1a with the cell receiving terminal 1n are allocated to these cell originating/receiving terminals 1a and 1n, so that the logical channel may be set up between the terminal 1a and the terminal 1n.

Next, in the case that after the logical channel has been set up between the terminal 1a and the terminal 1n in response to the call set-up request by which data is actually communicated, the terminal 1a stores the output port number $P_{O1a}$ and the channel identifier corresponding to the terminal 1n as the channel identification information for identifying the set-up logical channel into $P_O$ and LCN of the header portion respectively. Also, the terminal 1a transmits to the ATM switching apparatus 10, the cell 21 in which data to be transmitted has been stored into the payload portion.

Upon receipt of the cell 21, the line terminating unit 11a produces the routing information from the channel identification information and stores therein this routing information by adding the input port number $P_{I1a}$ corresponding to the terminal 1a to $P_I$ of the header portion of the cell 5 22, and outputs this cell 22 to the switch unit 12.

The switch unit 12 switches the cell 22 based on the output port number $P_o$ and the channel identifier LCN stored in the header portion of the cell 22, and then outputs the cell 22 from the output port $P_{o1n}$.

In response to the input of the cell 22, the line terminating unit 11n erases the output port number $P_{o1a}$ corresponding to the terminal 1n from the cell 22, and stores the input port number $P_{I1a}$ corresponding to the terminal 1a as $P_I$ to thereby produce the channel information from the routing information, and then transmits this cell 23 to the terminal 1n.

The terminal 1n receives this cell 23 to evaluate whether or not the data stored in the payload portion is received via the logical channel established between the terminal 1a and the own terminal 1n based upon the input port number $P_I$ and the channel identifier LCN of the header portion, and also performs a predetermined process.

It should be understood that when a cell is returned from the terminal 1n to the terminal 1a, $P_I$ is replaced by $P_o$ in the contrary manner to the above-explained operations, and the header portion of this cell is constituted and transmitted based upon the channel identification information provided from the call control unit 13 in response to the call set-up request originated from the terminal 1a.

In the same manner described above, the cell is switched and transferred to the terminal 1a.

As described above, when the ATM cell is transmitted, both the output port number and the channel identifier, which are provided as the channel identification information, are stored into the header portion of the ATM cell, and then the ATM cell is transmitted from the terminal. In the line terminating unit corresponding to the cell originating terminal, the number of input port of the switch unit corresponding to the cell originating terminal is attached to the header portion so as to produce the routing information. In the line terminating unit corresponding to the cell receiving terminal, this input port number of the switch unit is stored to thereby produce the channel identification information and also to transfer the produced channel identification information. As a consequence, such conversion tables for mutually converting the channel identification information and the routing information such as the VPI and VCI need not be employed in all of the line terminating units, which is different from the conventional ATM switching apparatus. Furthermore, the overall hardware amount of not only the line terminating units but also the ATM switching apparatus can be reduced, and also no longer such a high-cost and high-speed accessible memory which has been employed as the conversion table in the conventional ATM switching apparatus is required, resulting in a lower manufacturing cost. Also, in response to the call set-up request sent from the cell originating terminal, the routing information used in the switch unit as the channel identification information is provided from the call control unit to the cell originating terminal. Namely, in this case, the number of the output port of the switch unit corresponding to the cell receiving terminal, and the channel identifier indicative of the logical channel for coupling the cell originating terminal with the cell receiving terminal are notified to the cell receiving terminal. Further, the input port number of the switch unit corresponding to the cell originating terminal, and the channel identifier indicative of the logical channel are provided as the channel identification information to the cell receiving terminal. Accordingly, a portion of the routing information can be utilized as the channel information by executing the call set-up process conventionally owned by the terminal without newly adding a call set-up process to the terminal.

Then, a second embodiment of the present invention will now be explained with reference to FIG. 3.

Figure 3:
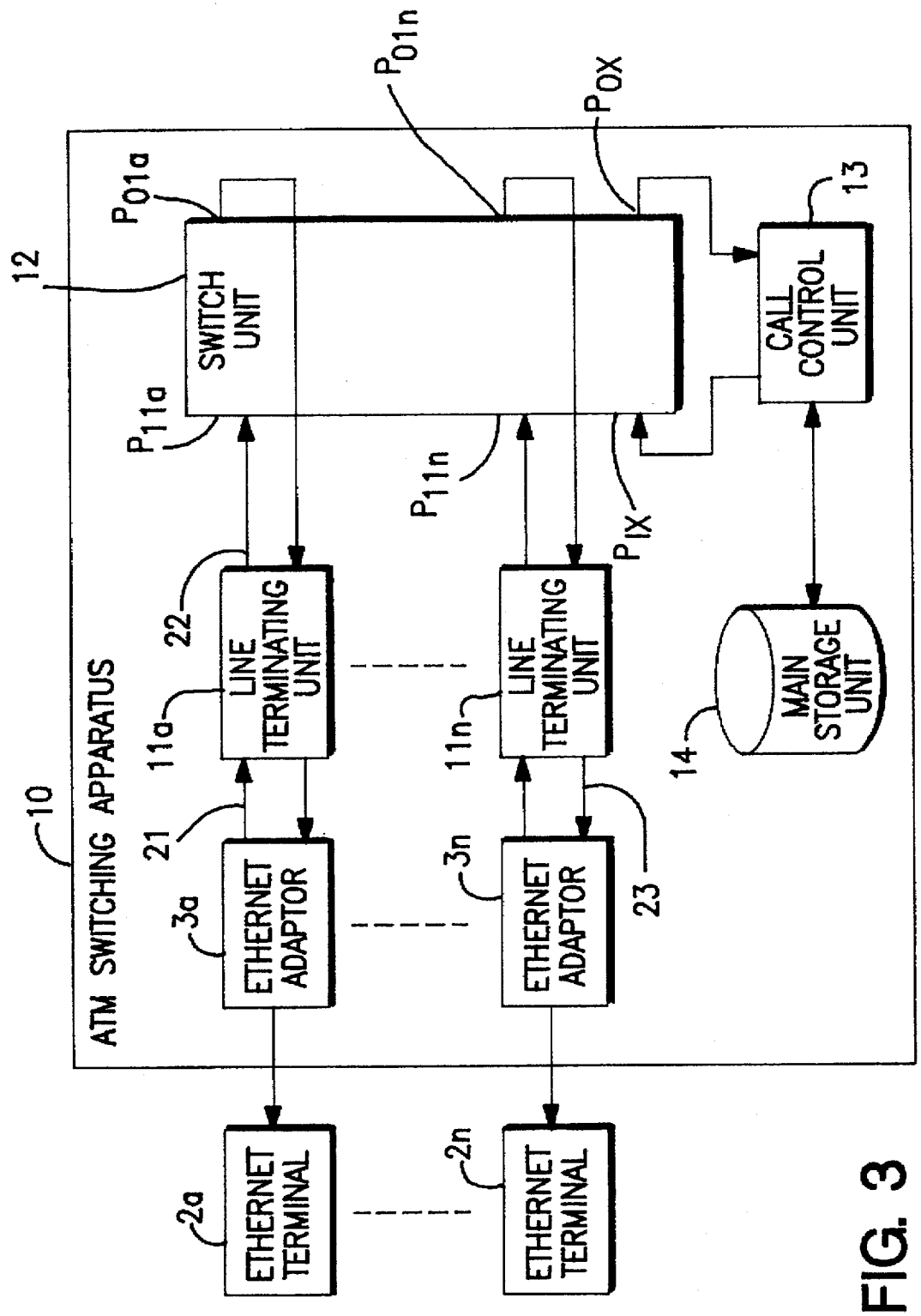
FIG. 3 is a block diagram showing a configuration of an ATM switching apparatus according to a second embodiment of the present invention.

FIG. 3 is a block diagram for representing an ATM switching apparatus (Ethernet switch). It should be noted that the same reference numerals employed in the foregoing description (see FIG. 1) will be employed as those for denoting the same or similar circuit portions.

In FIG. 3, reference numeral 20 shows an ATM switching apparatus for connecting and accommodating Ethernet terminals (will be referred to as "terminals" hereinafter) 2a to 2n, and reference numerals 3a to 3n denote Ethernet adaptors provided on the terminal sides of the respective line terminating units 11a to 11n. The Ethernet adaptors 3a to 3n have interface units for connecting the terminals 2a to 2n, and for mutually converting frames of Ethernet and ATM cells, to vice versa.

When a frame destined for the terminal 2n is received from the terminal 2a, the Ethernet adaptor 3a stores an output port number of the switch unit 12 corresponding to the terminal 2n and also a channel identifier for coupling the terminal 2a with the terminal 2n into a header portion based upon channel identification information corresponding to address information of this frame, and then outputs these output port number and channel identifier as a cell 21 to the line terminating unit 11a.

In response to this cell 21, the line terminating unit 11a adds an input port number of the switch unit 12 corresponding to the cell originating terminal 2a to thereby produce routing information, and transfers this cell 22 to the switch unit 12 in a manner similar to the above-described operation.

On the other hand, similar to the above-described operation, the line terminating unit 11n erases the output port number from the header portion of the input cell, and also stores again the input port number of the cell originating terminal 2a, so that channel identification information is produced, and the cell 23 is transferred to the Ethernet adaptor 3n.

In response to this cell 23, a frame of the Ethernet is produced by the Ethernet adaptor 3n based upon the channel identification information stored in the header portion of the cell 23, and then is transferred to the terminal 2n. Therefore, the frame sent from the terminal 2a is delivered to the terminal 2n.

In such a case that no logical channel is set which couples both terminals with each other indicated by the address information of the received frame, the Ethernet adaptor 3a transmits a call set-up request cell to the call control unit 13, and also constitutes a header portion of a cell based upon channel identification information constructed of a portion of routing information notified from the call controlling unit 13, and then transmits this cell in a manner similar to the above-described manner.

It should be noted that although the Ethernet adaptor for accommodating the Ethernet terminal is employed in the above-described embodiment, the present invention may be embodied not only in the Ethernet terminal, but also in such a terminal adaptor for accommodating therein a terminal having other protocols.

As described above, the terminal adaptor for accommodating the terminal other than the ATM terminal is provided between the line terminating unit and the terminal, the header portion of the cell is constituted based upon the channel identification information provided from the call control unit, and furthermore, the call set-up request is originated when no logical channel is set up between the one terminal and the counterpart terminal. As a result, even a terminal having a different protocol can be accommodated in the terminal adaptor, in a manner similar to that of the ATM terminal.

Although the present invention has been fully described by way of the preferred embodiments thereof with reference to the accompanying drawings, various changes and modifications will be apparent to those having skill in this field. Therefore, unless these changes and modifications otherwise depart from the scope of the present invention, they should be construed as included therein.

What is claimed is:

1. An ATM switching apparatus comprising:
   a self-routing type switch unit for switching an ATM cell based on routing information stored in a header portion of said cell, and provided with a plurality of input/output ports for inputting/outputting the ATM cell and also providing a channel identifier for coupling between an ATM terminal originating the ATM cell and an ATM terminal receiving the ATM cell; and
   a line terminating unit arranged between each of said input/output ports of said self-routing type switch unit and each said ATM terminal, and for mutually converting channel identification information stored in a header portion of an ATM cell delivered/received to/from said ATM terminal into the routing information stored in the header portion of the ATM cell delivered/received to/from said self-routing type switch unit and vice versa, thereby transferring said respective ATM cells; wherein:
   said channel identification information comprises either the input port number of the self-routing type switch unit corresponding to the ATM terminal originating the ATM cell or the output port number of the self-routing type switch unit corresponding to the ATM terminal receiving the ATM cell, and also a channel identifier indicative of a logical channel for coupling the ATM terminal originating the ATM cell with the ATM terminal receiving the ATM cell; and
   wherein said line terminating unit,
   (a) stores into the header portion of said ATM cell the routing information produced by adding said input port number to said output port number and said channel identifier, which are stored into the header portion of said ATM cell as the channel identification information, and then transfers the resultant cell to the self-routing type switch unit upon receipt of the ATM cell sent from the ATM terminal originating the ATM cell; and
   (b) erases said output port number stored as the routing information in the header portion of said ATM cell upon receipt of the cell sent from the self-routing type switch unit, and then stores into the header portion of said ATM cell the channel identification information produced from said input port number and said channel identifier, and then transfer the resultant cell to the ATM terminal receiving the ATM cell.

2. An ATM switching apparatus as claimed in claim 1 wherein:
   said ATM switching apparatus further comprises:
   a call control unit connected to preselected input/output ports of the self-routing type switch unit, for selecting an arbitrary logical channel for coupling the ATM terminal originating the ATM cell with the ATM terminal receiving the ATM cell, which are indicated by a call set-up request cell, upon receipt of said call set-up request cell sent from the ATM terminal originating the ATM cell, and for providing the output port number of the self-routing type switch unit corresponding to said ATM terminal receiving the ATM cell and also the channel identifier indicative of said logical channel as channel identification information to said ATM terminal originating the ATM cell, and further for providing the input port number of the self-routing type switch unit corresponding to said ATM terminal originating the ATM cell and also said channel identifier as the channel identification information to said ATM terminal receiving the ATM cell.

3. An ATM switching apparatus including, a self-routing type switch unit for switching an input ATM cell entered from an input port of said self-routing type switch unit and outputting said cell to an output port of said self-routing type switch unit based on routing information stored in a header portion of said ATM cell, a plurality of ATM terminals for sending and receiving ATM cells for communication, and a plurality of line terminating units, each line terminating unit connecting each of said ATM terminals to respective ones of said input port of said self-routing type switch unit for transferring input ATM cells from said ATM terminals to said self-routing type switch unit and to respective ones of said output port of said self-routing type switch unit for receiving switched ATM cells from said self-routing type switch unit for routing to respective ones of said ATM terminals, said ATM switching apparatus comprising:

a call control unit comprising a main storage unit storing control information, said call control unit for allocating and reserving a logical channel coupling one of said ATM terminals and another ATM terminal in response to a call set-up request from said one ATM terminal, and for providing a channel identifier as a number for the logical channel reserved for the call and an output port number of said self-routing type switch unit corresponding to one of said line terminating units associated with said another ATM terminal to each of said one and another ATM terminals as channel identification information.

4. An ATM switching apparatus according to claim 3, further comprising:

each of said ATM terminals comprising cell arrangement means for storing said logical channel number for the call and said output port number of said self-routing type switch unit corresponding to the one of said line terminating units associated with said another ATM terminal as channel identification information into a header portion of each said ATM cell to be transferred; and each of said line terminating units comprising, routing information arrangement means for adding an identification of said input port of said self-routing type switch unit corresponding to a respective one of said line terminating units to a header portion of each ATM cell received from said one ATM terminal, and channel identification information arrangement means for deleting said output port number stored in the header portion of each said ATM cell output from said self-routing type switch unit, and for arranging said identification of said input port of said self-routing type switch unit and the logical channel number as the channel identification information for transferring each ATM cell to said another ATM terminal.

* * * * *